US012147586B2

United States Patent
Paulraj et al.

(10) Patent No.: US 12,147,586 B2
(45) Date of Patent: Nov. 19, 2024

(54) SECURE WIPE OF DATA PROCESSING UNIT USING FIRMWARE CAPSULE

(71) Applicant: Dell Products L.P., Round Rock, TX (US)

(72) Inventors: Deepaganesh Paulraj, Bangalore (IN); Aniruddha Herekar, Bangalore (IN); Sriparna Som, Bangalore (IN); Jitendra Kumar Rath, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 331 days.

(21) Appl. No.: 17/714,324

(22) Filed: Apr. 6, 2022

(65) Prior Publication Data

US 2023/0325534 A1 Oct. 12, 2023

(51) Int. Cl.
*G06F 21/71* (2013.01)
*G06F 8/61* (2018.01)
*G06F 21/57* (2013.01)

(52) U.S. Cl.
CPC .............. *G06F 21/71* (2013.01); *G06F 8/63* (2013.01); *G06F 21/572* (2013.01); *G06F 2221/2143* (2013.01)

(58) Field of Classification Search
CPC ...... G06F 21/57; G06F 21/572; G06F 21/575; G06F 21/71; G06F 2221/2143; G06F 8/63; G06F 9/4411
See application file for complete search history.

(56) References Cited

U.S. PATENT DOCUMENTS

2016/0202964 A1 7/2016 Butcher et al.
2019/0095623 A1* 3/2019 Narasimhan .......... G06F 21/572
2019/0243637 A1* 8/2019 Nachimuthu .......... G06F 8/656
2019/0251266 A1 8/2019 Tuttle et al.
2021/0226846 A1 7/2021 Ballard et al.

OTHER PUBLICATIONS

International Search Report and Written Opinion of the International Searching Authority, International Application No. PCT/US2023/010289, mailed May 9, 2023.
Zimmer et al., "UEFI Networking and Pre-OS Security", Oct. 31, 2011, Retrieved from the Internet: https://www.researchgate.net/profile/Vincent_Zimmer/publication/235258577_UEFI_Networking_and_Pre-OS_Security/links/0fcfd510b3ff7138f4000000.pdf, retrieved May 3, 2016, entire document.

* cited by examiner

*Primary Examiner* — Olugbenga O Idowu
(74) *Attorney, Agent, or Firm* — Jackson Walker L.L.P.

(57) ABSTRACT

An information handling system may include a processor, a data processing unit communicatively coupled to the processor, and a management controller communicatively coupled to the processor and the data processing unit and configured for out-of-band management of the information handling system. The management controller may further be configured to obtain a hardware inventory and capabilities of the data processing unit; based on the hardware inventory and capabilities, generate a firmware capsule for execution during a basic input/output system phase of the data processing unit to cause a secure erasure of contents of a memory of the data processing unit; and communicate the firmware capsule to the data processing unit during an operating system phase of the data processing unit and cause the data processing unit to reboot to its basic input/output system phase in order to execute drivers of the firmware capsule in order to securely erase the memory.

9 Claims, 3 Drawing Sheets

SECURE WIPE OF DATA PROCESSING UNIT USING FIRMWARE CAPSULE

TECHNICAL FIELD

The present disclosure relates in general to information handling systems, and more particularly to methods and systems for secure wipe of a data processing unit using a firmware capsule.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are increasingly using data processing units or DPUs. A DPU may be thought of as a "system within a system" or "computer within a computer," in that a DPU may comprise a specialized card with its own processor, local storage, and operating system stored on such local storage. One example of a DPU is a smart network interface card or "smartNIC" that may offer capabilities not found in traditional network interface cards (NICs). In addition to the stateful and custom offloads a smartNIC may provide, it may have an independent management domain with a separate operating system, independent credentials, and independent remote access.

Existing approaches do not enable secure erasing or "wiping" contents of a DPU in a manner that is hardware- and vendor-agnostic, as present solutions require vendor- or operating system-specific erase mechanisms which may require use of vendor-specific tools.

SUMMARY

In accordance with the teachings of the present disclosure, the disadvantages and problems associated with existing approaches to wiping a DPU may be reduced or eliminated.

In accordance with embodiments of the present disclosure, an information handling system may include a processor, a data processing unit communicatively coupled to the processor, and a management controller communicatively coupled to the processor and the data processing unit and configured for out-of-band management of the information handling system. The management controller may further be configured to obtain a hardware inventory and capabilities of the data processing unit; based on the hardware inventory and capabilities, generate a firmware capsule for execution during a basic input/output system phase of the data processing unit to cause a secure erasure of contents of a memory of the data processing unit; and communicate the firmware capsule to the data processing unit during an operating system phase of the data processing unit and cause the data processing unit to reboot to its basic input/output system phase in order to execute drivers of the firmware capsule in order to securely erase contents of the memory.

In accordance with these and other embodiments of the present disclosure, a method may be provided for use in an information handling system comprising a processor and a data processing unit communicatively coupled to the processor, and a management controller communicatively coupled to the processor and the data processing unit and configured for out-of-band management of the information handling system. The method may include obtaining, by the management controller, a hardware inventory and capabilities of the data processing unit; based on the hardware inventory and capabilities, generating, by the management controller, a firmware capsule for execution during a basic input/output system phase of the data processing unit to cause a secure erasure of contents of a memory of the data processing unit; and communicating, by the management controller, the firmware capsule to the data processing unit during an operating system phase of the data processing unit and causing the data processing unit to reboot to its basic input/output system phase in order to execute drivers of the firmware capsule in order to securely erase contents of the memory.

In accordance with these and other embodiments of the present disclosure, an article of manufacture may include a non-transitory computer-readable medium and computer-executable instructions carried on the computer-readable medium, the instructions readable by a management controller of an information handling system in an information handling system comprising a processor and a data processing unit communicatively coupled to the processor, and the management controller communicatively coupled to the processor and the data processing unit and configured for out-of-band management of the information handling system. The instructions, when read and executed, may cause the management controller to: obtain a hardware inventory and capabilities of the data processing unit; based on the hardware inventory and capabilities, generate a firmware capsule for execution during a basic input/output system phase of the data processing unit to cause a secure erasure of contents of a memory of the data processing unit; and communicate the firmware capsule to the data processing unit during an operating system phase of the data processing unit and cause the data processing unit to reboot to its basic input/output system phase in order to execute drivers of the firmware capsule in order to securely erase contents of the memory.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
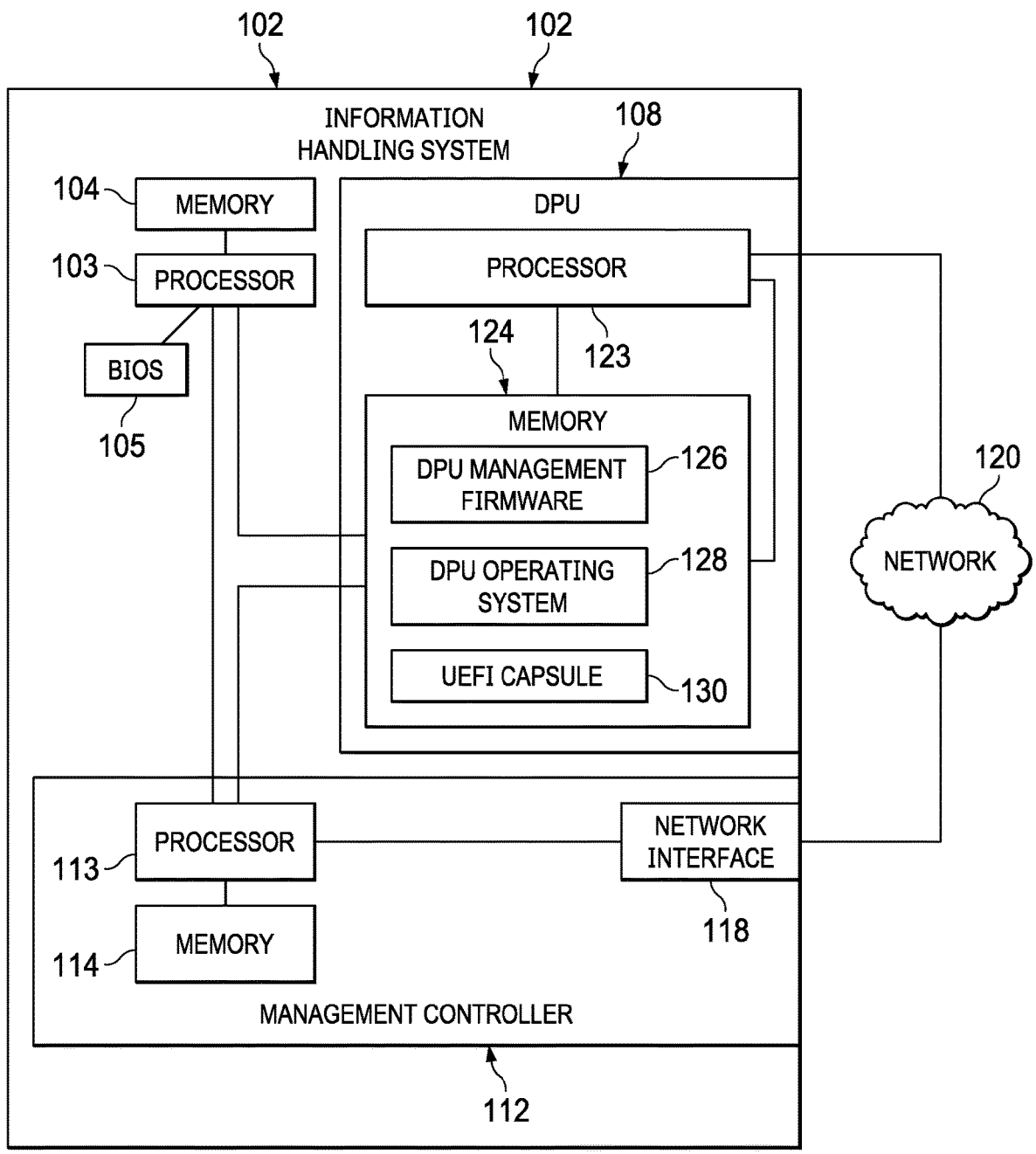
FIG. 1 illustrates a block diagram of an example information handling system, in accordance with embodiments of the present disclosure.
Figure 2:
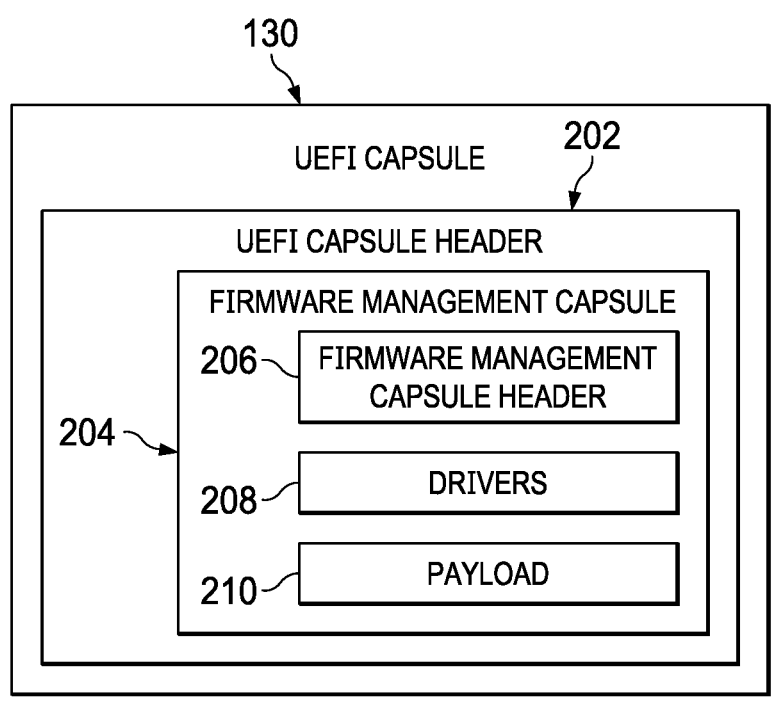
FIG. 2 illustrates a block diagram of an example custom firmware capsule, in accordance with embodiments of the present disclosure.
Figure 3:
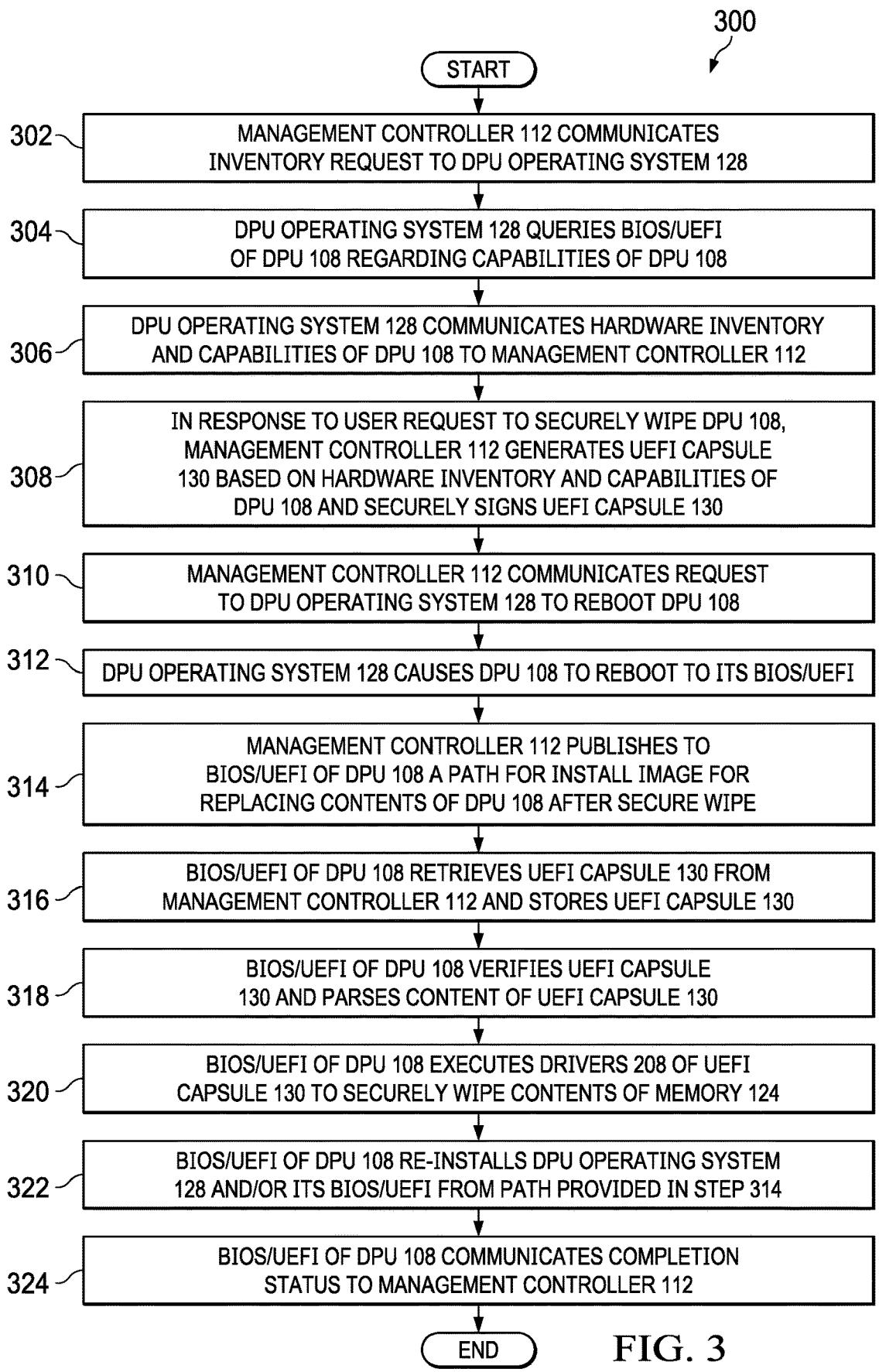
FIG. 3 illustrates a flow chart of an example method for secure wipe of a DPU using a firmware capsule, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise or be an integral part of a server. In other embodiments, information handling system 102 may be a personal computer. In these and other embodiments, information handling system 102 may be a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a basic input/output (BIOS) system 105 communicatively coupled to processor 103, a DPU 108 communicatively coupled to processor 103, and a management controller 112 communicatively coupled to processor 103 and DPU 108.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., memory 104) may be executed by processor 103 and given control of information handling system 102.

DPU 108 may comprise any suitable system, apparatus, or device that comprises a specialized card or other peripheral with its own processor, local storage, and operating system stored on such local storage, and may in essence function itself as an information handling system. In some embodiments, DPU 108 may also be known as a smartNIC, functional accelerator card (FAC), functional off-load coprocessor (FOCP), or distributed services card (DSC). As shown in FIG. 1, DPU 108 may comprise a processor 123 and memory 124

Processor 123 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 123 may interpret and/or execute program instructions and/or process data stored in memory 124 and/or another component of DPU 108.

Memory 124 may be communicatively coupled to processor 123 and may include any system, device, or apparatus configured to retain program instructions and/or data for a period of time (e.g., computer-readable media). Memory 124 may include RAM, EEPROM, a PCMCIA card, flash memory, magnetic storage, opto-magnetic storage, or any suitable selection and/or array of volatile or non-volatile memory that retains data after power to DPU 108 is turned off. As shown in FIG. 1, memory 124 may have stored thereon DPU management firmware 126, DPU operating system 128, and UEFI capsule 130.

DPU management firmware 126 may comprise a program of instructions which may be read and executed by processor 123 for serving as a management interface between management controller 112 and DPU 108. For example, in some embodiments, DPU management firmware 126 may implement a Network Controller Sideband Interface (NC-SI) between DPU 108 and management controller 112.

DPU operating system 128 may comprise any program of executable instructions, or aggregation of programs of executable instructions, configured to, when executed by processor 123, manage and/or control the allocation and usage of hardware resources of DPU 108 such as memory, processor time, disk space, and input and output devices, and provide an interface between such hardware resources and application programs hosted by DPU operating system 128.

UEFI capsule 130 may comprise a dynamic customized capsule secured by a vendor signature and may be embedded with respective vendor drivers based on capabilities and hardware configuration of DPU 108. As described in greater detail below, such drivers may be employed to securely wipe contents of memory 124, as described in greater detail below.

Management controller 112 may be configured to provide out-of-band management facilities for management of information handling system 102. Such management may be made by management controller 112 even if information handling system 102 is powered off or powered to a standby state. Management controller 112 may include a processor 113, memory 114, and an out-of-band network interface 118 separate from and physically isolated from an in-band network interface (e.g., DPU 108). In certain embodiments, management controller 112 may include or may be an integral part of a baseboard management controller (BMC), a remote access controller (e.g., a Dell Remote Access Controller or Integrated Dell Remote Access Controller), or an enclosure controller. In other embodiments, management controller 112 may include or may be an integral part of a chassis management controller (CMC).

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102 or management controller 112.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to management controller 112 is turned off. Memory 114 may have stored thereon software and/or firmware which may be read and executed by processor 113 for carrying out the functionality of management controller 112.

Network interface 118 may comprise any suitable system, apparatus, or device operable to serve as an interface between management controller 112 and/or one or more other information handling systems. Network interface 118 may enable management controller 112 to communicate using any suitable transmission protocol and/or standard. In these and other embodiments, network interface 118 may comprise a network interface card, or "NIC."

In addition to processor 103, memory 104, BIOS 105, DPU 108, and management controller 112, information handling system 102 may include one or more other information handling resources.

Network 120 may comprise a network and/or fabric configured to couple information handling system 102 to one or more other information handling systems. In these and other embodiments, network 120 may include a communication infrastructure, which provides physical connections, and a management layer, which organizes the physical connections and information handling systems communicatively coupled to network 120. Network 120 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 120 may transmit data via wireless transmissions and/or wire-line transmissions using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 120 and its various components may be implemented using hardware, software, or any combination thereof.

In operation, management controller 112 may build a dynamic, customized UEFI capsule 130 secured by vendor signature and embedded with vendor drivers for wiping DPU 108 based on capabilities and hardware configuration of DPU 108. Further, management controller 112 may inject UEFI capsule 130 to memory 124 of DPU 108 via a secure channel, and UEFI capsule 130 may execute during BIOS/UEFI of DPU 108 in order to self-erase all or a portion of memory 124. This secure wipe solution may be DPU UEFI and operating system independent and thus may be extended to perform other operations such as BIOS reset to default, operating system installation, and driver firmware installation.

FIG. 2 illustrates a block diagram of an example custom UEFI capsule 130, in accordance with embodiments of the present disclosure. As shown in FIG. 2, UEFI capsule 130 may include a UEFI capsule header 202 setting forth metadata and a firmware management capsule 204. In turn, firmware management capsule 204 may include firmware management capsule header 206, drivers 208, and a payload 210. One or more drivers 208 may be configured to execute during the BIOS/UEFI phase of DPU 108 in order to perform secure wipe of memory 124.

FIG. 3 illustrates a flow chart of an example method 300 for secure wipe of memory 124 of DPU 108 using UEFI capsule 130, in accordance with embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, management controller 112 may communicate an inventory request to DPU operating system 128 (e.g., via DPU management firmware 126). At step 304, responsive to the inventory request, DPU operating system 128 may query the BIOS/UEFI of DPU 108 regarding capabilities of DPU 108. At step 306, DPU operating system 128 may communicate a hardware inventory and capabilities of DPU 108 to management controller 112 (e.g., via DPU management firmware 126).

At step 308, in response to a user request (e.g., by an end user or administrator of information handling system 102) to securely wipe DPU 108, management controller 112 may generate UEFI capsule 130 based on the hardware inventory and capabilities of DPU 108 and may securely sign (e.g., with a public key of a public-private key pair associated with a vendor of DPU 108) UEFI capsule 130.

At step 310, management controller 112 may communicate (e.g., via Redfish or other communications specification/protocol) a request to DPU operating system 128 to reboot DPU 108. In response to the request, at step 312, DPU operating system 128 may cause DPU 108 to reboot to its BIOS/UEFI.

At step 314, management controller 112 may publish to the BIOS/UEFI of DPU 108 a path (e.g., Hypertext Transfer Protocol path) for an install image for replacing contents of DPU 108 after the secure wipe.

At step 316, the BIOS/UEFI of DPU 108 may retrieve UEFI capsule 130 from management controller 112 and store UEFI capsule 130 (e.g., on memory 124). At step 318, the BIOS/UEFI of DPU 108 may verify the signature of UEFI capsule 130 (e.g., using a private key of a public-private key pair) and parse the contents of UEFI capsule 130 including payload information.

At step 320, the BIOS/UEFI of DPU 108, executing drivers 208 of UEFI capsule 130, may securely wipe contents of memory 124. At step 322, the BIOS/UEFI of DPU 108 may re-install DPU operating system 128 and/or its BIOS/UEFI from the path provided in step 314 above.

At step 324, after completion of the wipe and re-installation, the BIOS/UEFI of DPU 108 may communicate a completion status to management controller 112. After completion of step 324, method 300 may end.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
a processor;
a data processing unit communicatively coupled to the processor;
a management controller communicatively coupled to the processor and the data processing unit and configured for out-of-band management of the information handling system, the management controller further configured to:
obtain a hardware inventory and capabilities of the data processing unit;
based on the hardware inventory and capabilities, generate a firmware capsule for execution during a basic input/output system phase of the data processing unit to cause a secure erasure of contents of a memory of the data processing unit; and
communicate the firmware capsule to the data processing unit during an operating system phase of the data processing unit and cause the data processing unit to reboot to its basic input/output system phase in order to execute drivers of the firmware capsule in order to securely erase contents of the memory.

2. The information handling system of claim 1, the management controller further configured to securely sign the firmware capsule prior to communicating the firmware capsule to the data processing unit.

3. The information handling system of claim 1, the management controller further configured to publish a path for an install image for replacing contents of the memory following erasure of the contents of the memory.

4. A method, in an information handling system comprising a processor and a data processing unit communicatively coupled to the processor, and a management controller communicatively coupled to the processor and the data processing unit and configured for out-of-band management of the information handling system, the method comprising:
obtaining, by the management controller, a hardware inventory and capabilities of the data processing unit;
based on the hardware inventory and capabilities, generating, by the management controller, a firmware capsule for execution during a basic input/output system phase of the data processing unit to cause a secure erasure of contents of a memory of the data processing unit; and
communicating, by the management controller, the firmware capsule to the data processing unit during an operating system phase of the data processing unit and causing the data processing unit to reboot to its basic input/output system phase in order to execute drivers of the firmware capsule in order to securely erase contents of the memory.

5. The method of claim 4, further comprising securely signing, by the management controller, the firmware capsule prior to communicating the firmware capsule to the data processing unit.

6. The method of claim 4, further comprising publishing, by the management controller, a path for an install image for replacing contents of the memory following erasure of the contents of the memory.

7. An article of manufacture comprising:
a non-transitory computer-readable medium; and
computer-executable instructions carried on the computer-readable medium, the instructions readable by a management controller of an information handling system in an information handling system comprising a processor and a data processing unit communicatively coupled to the processor, and the management controller communicatively coupled to the processor and the data processing unit and configured for out-of-band management of the information handling system, the instructions, when read and executed, for causing the management controller to:
obtain a hardware inventory and capabilities of the data processing unit;
based on the hardware inventory and capabilities, generate a firmware capsule for execution during a basic input/output system phase of the data processing unit to cause a secure erasure of contents of a memory of the data processing unit; and
communicate the firmware capsule to the data processing unit during an operating system phase of the data processing unit and cause the data processing unit to reboot to its basic input/output system phase in order to execute drivers of the firmware capsule in order to securely erase contents of the memory.

8. The article of claim 7, the instructions for further causing the management controller to sign the firmware capsule prior to communicating the firmware capsule to the data processing unit.

9. The article of claim 7, the instructions for further causing the management controller to publish a path for an install image for replacing contents of the memory following erasure of the contents of the memory.

* * * * *